Figure 2:
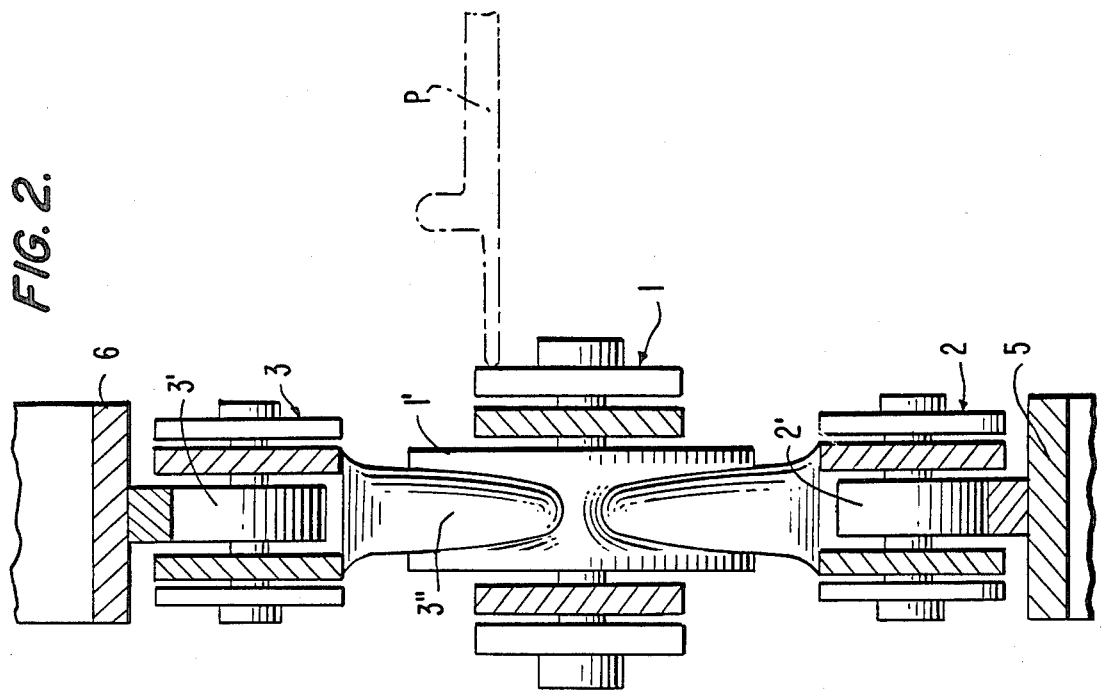

United States Patent [19]

Nevo-Hacohen

[11] Patent Number: 4,795,026
[45] Date of Patent: Jan. 3, 1989

[54] CONVEYOR DRIVE SYSTEM UTILIZING DRIVEN AND IDLER DOG CHAINS

[75] Inventor: Jacob I. Nevo-Hacohen, Brookline, Mass.

[73] Assignee: Auto-Veyor, Inc., Brookline, Mass.

[21] Appl. No.: 870,846

[22] Filed: Jun. 5, 1986

[51] Int. Cl.[4] .................................... B65G 23/14
[52] U.S. Cl. ........................ 198/833; 198/465.3
[58] Field of Search ............. 198/833, 683, 684, 685, 198/687, 841, 570, 797, 800

[56] References Cited

U.S. PATENT DOCUMENTS

| | | | |
|---|---|---|---|
| 1,706,905 | 3/1929 | Stockly et al. | 198/833 X |
| 1,817,970 | 8/1931 | Da Costa | 198/683 |
| 2,309,587 | 1/1943 | Hassler | 198/683 X |
| 2,809,744 | 10/1957 | Hapman | 198/833 X |
| 2,868,356 | 1/1959 | Haaff | 198/833 |
| 2,918,020 | 12/1959 | Henderson et al. | 198/833 X |
| 3,032,173 | 5/1962 | King | 198/684 X |
| 3,033,353 | 5/1962 | Burnett et al. | 198/833 |
| 3,197,045 | 7/1965 | Nevo-Hacohen | 198/797 X |
| 3,447,666 | 6/1969 | Nevo-Hacohen | 198/800 |
| 3,760,936 | 9/1973 | Vilenetal | 198/833 X |
| 4,493,414 | 1/1985 | Nevo-Hacohen | 198/800 |

*Primary Examiner*—Leslie J. Paperner
*Assistant Examiner*—D. Glenn Dayoan
*Attorney, Agent, or Firm*—Rines and Rines, Shapiro and Shapiro

[57] ABSTRACT

Combined driven and idler dog chain assemblies engaging opposite sides of a main chain conveyor enable the driving of heavily loaded and long conveyor systems at one or more selected straight-line track sections, with minimal wear.

7 Claims, 2 Drawing Sheets

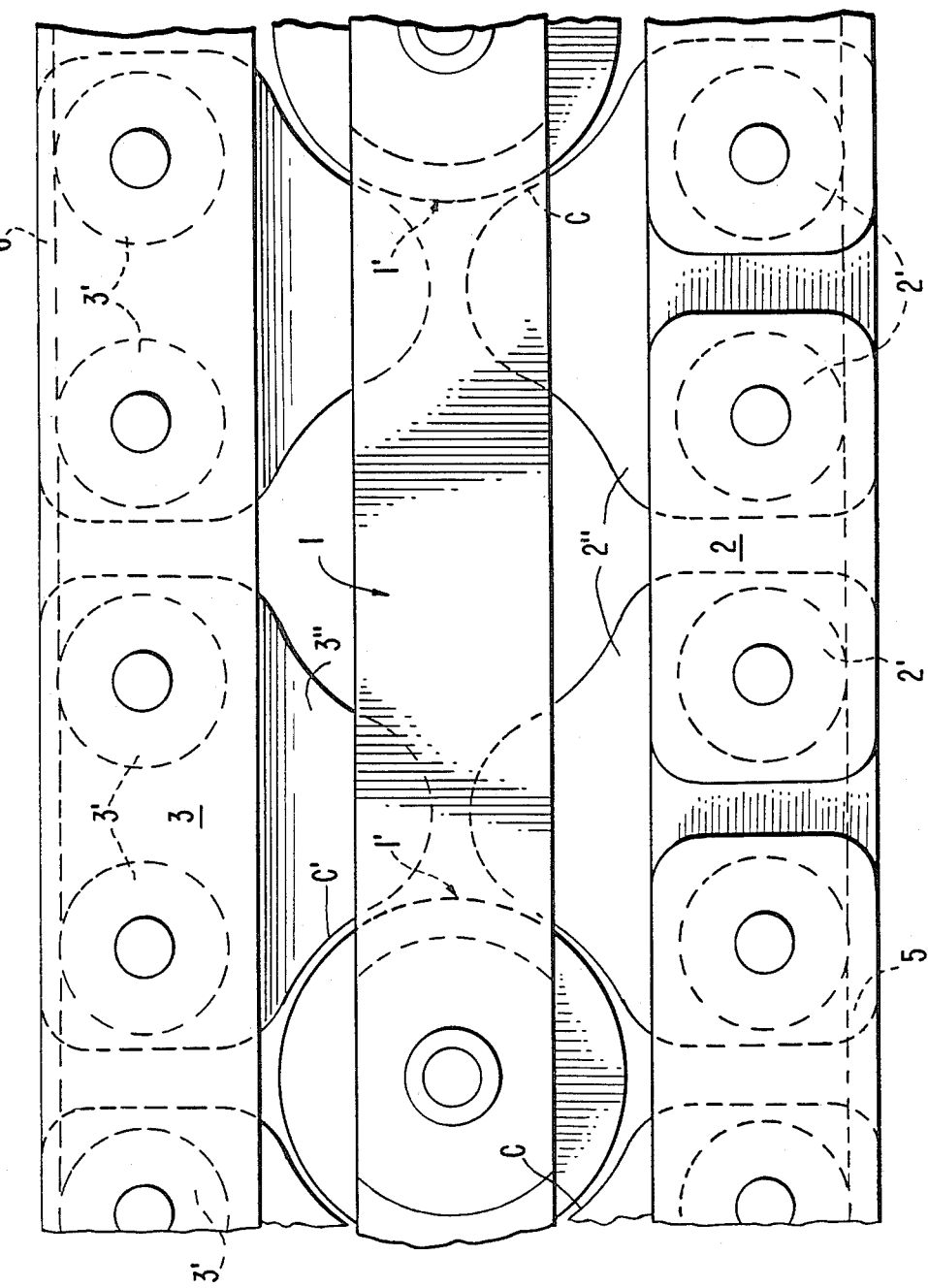

CONVEYOR DRIVE SYSTEM UTILIZING DRIVEN AND IDLER DOG CHAINS

The present invention relates to conveyor apparatus as of the continuous chain-drive type and the like, being more particularly directed to such conveyors that have long travel paths and that may require curves, lifting loops or other direction-changing sections; being more specifically concerned with dog-chain systems for long and relatively heavily loaded chain conveyors and the like. Among such, for example, are those used in conveyor elevator apparatus as for automobiles or other articles such as disclosed in my prior U.S. Pat. Nos. 3,197,045, 3,447,666 and 4,493,414.

First, in general, dog-chain drives are extensively used for long chain conveyors such as those utilized in manufacturing, warehousing and assembly lines. The important advantage of the dog-chain drive, is that it can be installed practically at any point in a straight section of a chain conveyor and drive the same. However, the current drive systems suffer severe wear problems, later more fully discussed, requiring that the driven conveyor chain be made of wear-resistant material such as cast iron. The latter, however, being weak for handling tension forces, limits the application of the chain conveyor to the handling of relatively small loads. Also, on long conveyors, with sloped rising sections as for lifting, it is necessary to install several dog-chain drive units with the attendant problems of synchronization and take-ups. The severe wear problem, moreover, requires that a stand-by drive be also provided.

In such systems, there are problems in the practical drive of chains operating with rollers, particularly, as above stated, where long lengths are involved and where lifting or direction-changing sections are required, and further where heavy loads are to be transported. Basically, when using a sprocket drive for a long-pitch conveyor chain, because there must be, in practice, enough chain length wrapped around the sprocket to have at least 2–3 teeth engaged, this results in a large-radius sprocket. Then, the before-described dog chains become, in many cases, the solution to operate the conveyor. A first problem in such arrangements, however, arises from the fact that the dog is moving at a somewhat larger radius than the drive chain, giving rise to a difference in speed of the drive chain and the dog. This necessitates providing a very large radius of structure so that such difference will be negligible; and, in addition, the dog must be sloped in such a manner that it will be effectively retarding its touching of the roller of the driven chain. Because the surface of contact between the dogs of the drive chain and the driven chain is on a slope, moreover, there is a tendency of the driven chain to disengage, requiring the use of hold-down rollers. A further problem with such mechanisms is that the forces that tend to disengage the driven chain are large and cause substantial wear of the side bars of the chain by the hold-down rollers. To obviate these difficulties, the prior art has resorted to cast iron construction, as disclosed, for example, in a current Union Engineering "Steel Chain" brochure of Litton Industries, page 43. The cast iron provides a hard surface that resists wear, but at the same time limiting the conveyor use to smaller-type loads which exert smaller tension on the system. Resort has also been taken to a standby drive that can become operational on relatively short notice.

Such remedies applied to the problems of automatic conveyors for automobile storage and retrieval, as in parking garages and the like, are practically wanting, and reduce the ability to handle the tensions required for such applications.

A vastly different approach was accordingly evolved to solve this problem by creating another dog chain, as an idler, such that when engaged, the rollers of the driven chain are hugged by the dogs on both sides, and each one of these has its own rollers, rolling along the track with purely rolling friction and not sliding friction, inherently causing substantially negligible wear and very neat operation.

This invention is particularly applicable to the driving of heavily loaded conveyors, utilizing long-pitch chains, wherein two dog chains are provided, one driven and one idler, engaging and hugging the driven chain, pulling and carrying it through a trough-like track. The contact areas are (1) between the pair of dog chains and the driven chain (the dogs and the driven chain rollers); and (2) between the dog chains and the track, (the dog-chain rollers and the hard surfaced tracks). Thus, there is a rolling action provided in accordance with the invention with practically no sliding friction associated therewith. This novel type of arrangement, moreover, can be implemented with drivers and contact surfaces that are of standardly hardened materials, enabling smaller friction considerations and improved wear of the components.

In summary, from one of its important aspects, the invention provides for use in apparatus for driving a relatively long-pitch link-roller main chain having a substantial straight-line track section along which conventional dog-chain and hold-down rollers drives otherwise have engagement and wear problems, the combination with said main chain of a first drive dog roller chain, in turn driven by drive means, and configured to engage one side of said main chain parallely with its straight-line track section; a second similar but idler dog roller chain engaging the opposing side of said main chain parallely with said straight-line track section; and the three chains, when thus engaged, rolling on their respective rollers to move along said straight-line track section with the forces between the main chain rollers and the drive and idler dog chains being divided between longitudinally pulling the main chain along the track and a transverse force loading the track structure, and with very small resistance of rolling engagement. Preferred and best mode embodiments are hereinafter set forth.

Figure 1:
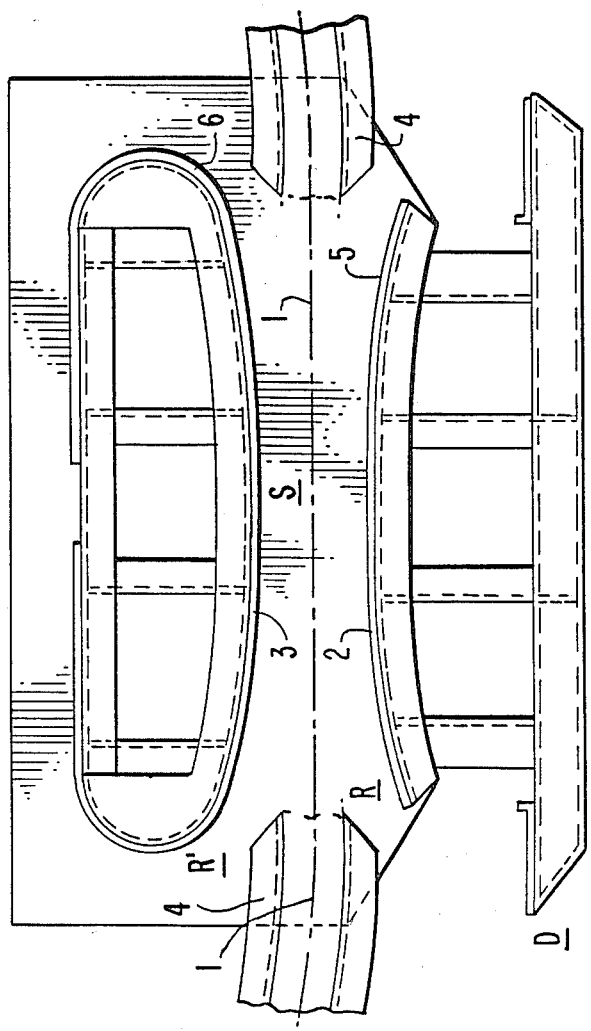

The invention will now be described in connection with the accompanying drawings illustrating its application to chain conveyors as for vehicle or other heavy loaded platforms carried thereby, FIG. 1 of which is a schematic side elevation showing the main driven chain and the pair of dog chains, one driven and one idling;

FIG. 2 is a transverse section, upon a somewhat large scale, and illustrating more detail of driven and idler dog chain-driven chain engagement; and FIG. 3 is a side elevation similar to FIG. 1, more particularly showing regions of drive and idler engagement.

An object of the present invention, thus, is to provide a new and improved conveyor drive system that is not subject to the above-mentioned wear and cast iron construction problems of previous systems and techniques, but enables chain drives with improved operation and ultimate simplicity.

A further object is to provide a new and improved conveyor drive system (hereinafter often generically referred to as "chain") that has wide tension variation capacity and is of more general utility, as well.

Other and further objects will be explained hereinafter and are more particularly delineated in the appended claims.

Referring to FIG. 1, the center line of the main driven chain is shown at 1, carried within a track 4 and having a straight-line section S. In actual practice, the main chain 1 will be constructed as a pair of parallel spaced conveyor chains 1 traveling in parallel tracks 4 as described in said Letters Patent, for example, with load-bearing platforms mounted therebetween, as schematically shown dotted at P in hereinafter described FIG. 2. Above the straight-line section S is positioned, in the straight-line section interruption or break in the track 4, an idler dog chain 3 carried in a track 6, and below which is positioned a driven dog chain 2 within a track 5. The dog chain 2 may be sprocket or otherwise driven therebelow in conventional fashion, schematically illustrated at D. The engagement of the dog chains 2 and 3 with the opposite lower and upper sides of the chain 1 is parallely on the straight-line section S. A large radius curvature is provided at R for the drive idler chain 2 and at R' for the idler chain 3 before the engagement with the main chain 1, to accommodate for different speeds of main and dog chains where the chain dog projects over the drive chain with a larger radius To obviate this problem, a large radius R and R' in advance of the straight-line engagement section S is provided, causing this speed difference to become very small; and by cut-back or curved sloped dog design, as shown, the problem of engagement right at the roller of the driven chain is minimized. While the layout of the drive and idler dog chains 3 and 2 are thus similar, they both allow for large-radius approaches R and R' of the dog-chains to be engaged with and disengaged from the drive chain 1 for smooth operation.

More detail is shown in FIGS. 2 and 3 wherein the driven or main chain 1 is centrally illustrated with its internal rollers 1' upwardly engaged by the dog tooth 3" of the idler dog chain 3 moving by its rollers 3' within the upper track 6, and downwardly engaged by the drive dog chain 2 carried by its rollers 2' in its track 5.

In FIG. 3, the movement is from left to right. The dog-drive chain 2 is moving longitudinally (horizontally) from left to right and its dogs 2" engage and push the rollers 1' of the main driven chain 1. The sloped force, as at contact area C, for example, creates a transverse vertical component which is pressing the dog-chain drive rollers 2' into the hard track 5. The sloped force against dogs 3" of idler dog chain 3 occurs, for example, at contacting surfaces C', pressing the dog chain idler rollers 3' against the hard upper track 6. The effect of the sloped forces at C is also a horizontal pull to the right of the driven chain 1. The horizontal components of these sloped forces cause tension in the connecting link, with the difference between the two horizontal components causing the movement of the idler chain. The troughs or tracks 5 and 6 are designed and constructed to withstand these transverse pressing forces against them and to contain them.

As an illustration, an installation adapted for carrying vehicle-storing platforms along a main chain conveyor 1 used rollers 1' of 6 inches diameter; idler and driven dog chain rollers 3' and 2' of 3 inches diameter; dogs 2" and 3" with sloped dog teeth projecting toward the main chain to engage the roller 1' with complementary radius, as shown in FIG. 3 (the dog extending about 7⅜ inches below and above the respective tracks 6 and 5); and a radius of dog chain entrance and exit (R,R') at the straight-line section break in main chain track 4 of about 88 inches.

While described with reference to chain conveyors for automobile storage and retrieval, as before stated, the invention is clearly of broader applicability to other long and relatively heavily loaded conveyors for other uses as well, providing facile drive sections for extremely long and/or heavy-loaded conveyor systems at pluralities of straight-line sections. Further modifications will also occur to those skilled in this art and such are considered to fall within the spirit and scope of the invention as defined in the appended claims.

What is claimed is:

1. In combination with a long-pitch link-roller main chain having a substantially straight-line section located at an interruption in a track that supports rollers of the main chain at opposite ends of the straight-line section, apparatus for driving said main chain comprising a dog-roller drive chain extending along said straight-line section of said main chain at one side thereof and a dog-roller idler chain extending along said straight-line section of said main chain at the opposite side thereof, dogs of said drive chain engaging corresponding rollers of said main chain to move said main chain along said straight-line section, and dogs of said idler chain engaging corresponding rollers of said main chain to move said idler chain along said straight-line section, each of said drive and idler chains having, along said straight-line section, a track supporting the rollers of the drive chain or the idler chain, said dogs of said drive and idler chains being shaped at regions of engagement with said rollers of said main chain so that the longitudinal driving of said main chain along said straight-line section creates transverse reactive force components against said tracks of said drive and idler chains via the rollers thereof.

2. Apparatus in accordance with claim 1, wherein said dogs are shaped at said regions of engagement to provide curved sloping surfaces that complement the engaged rollers of the main chain.

3. Apparatus in accordance with claim 1, wherein each engaged roller of the main chain is embraced between a dog of said drive chain and a dog of said idler chain.

4. Apparatus in accordance with claim 1, wherein each engaged roller of the main chain is embraced by four dogs, two from said drive chain and two from said idler chain, the four dogs being disposed so as to substantially surround the corresponding roller of the main chain.

5. Apparatus in accordance with claim 1, wherein each of said dogs is substantially symmetrical with respect to a line perpendicular to the direction of movement of the main chain along said straight-line section.

6. Apparatus in accordance with claim 1, wherein each of said drive and idler chains has a large-radius curved section at least one of the ends of said straight-line section.

7. Apparatus in accordance with claim 1, wherein the main chain has an associated further main chain parallel thereto, said main chains carrying load-bearing platforms therebetween.

* * * * *